Feb. 20, 1940. H. C. FRENTZEL, JR., ET AL 2,190,869

DUMPING MECHANISM

Filed May 2, 1938 2 Sheets-Sheet 1

INVENTORS
H. C. Frentzel, Jr.
BY C. J. Novotny
Morsell, Lieber & Morsell
ATTORNEYS.

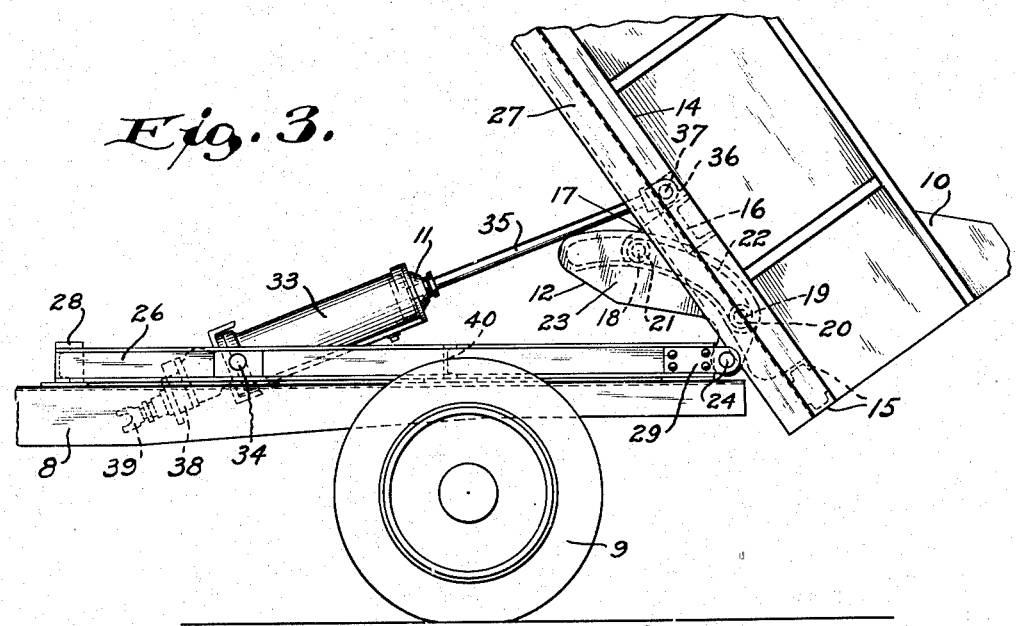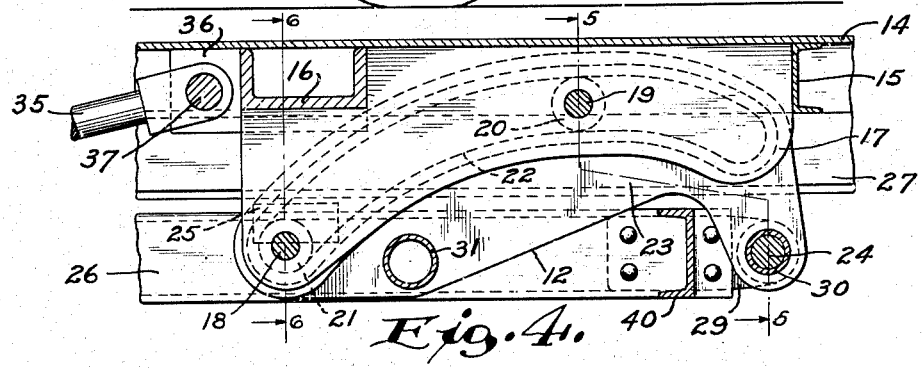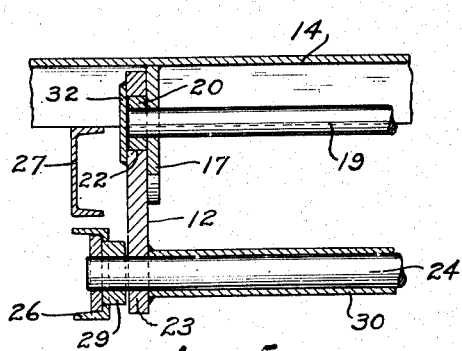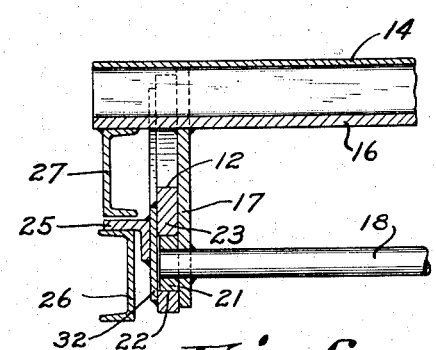

Patented Feb. 20, 1940

2,190,869

UNITED STATES PATENT OFFICE 2,190,869

DUMPING MECHANISM

Herman C. Frentzel, Jr., Shorewood, and Carl G. Novotny, Milwaukee, Wis., assignors to The Heil Co., Milwaukee, Wis., a corporation of Wisconsin Application May 2, 1938, Serial No. 205,436

5 Claims. (Cl. 298—22)

Our invention relates generally to improvements in the art of transporting materials in bulk, and relates more specifically to improvements in the construction and operation of mechanism for tilting or dumping load carrying bodies in order to deliver material therefrom.

Generally defined, an object of the present invention is to provide a simple, compact and efficient dumping mechanism for a load carrying platform or body carried by a vehicle.

It has heretofore been proposed to provide various types of dumping rigs for tilting or swinging load carrying bodies so as to deliver the material within the bodies either from the sides or ends thereof. In many of these prior dumping assemblages, it has also been proposed to utilize hydraulic hoists or jacks to effect the actual dumping. When a body of relatively large capacity is heavily loaded, it requires either very high unit fluid pressure or extremely large and bulky hoists, in order to start the loaded body on its initial dumping movement, due to the inertia of the mass and the low disposition of its center of gravity. While numerous attempts have been made to provide simple and effective means for eliminating these high initial or starting pressures in small hydraulic hoists, these prior attempts have not been commercially successful either because of objectionable complications introduced or due to inability to accomplish the desired results.

Our present invention therefore contemplates provision of an extremely simple rig which makes it possible to utilize a relatively small and compact hydraulic jack operable with comparatively low pressure, to dump a heavily loaded truck body in a rapid and efficient manner.

Another specific object of the invention is to provide an improved hydraulically actuated dumping mechanism for load supports, wherein substantially uniform fluid pressure prevails in the hydraulic system throughout the entire dumping operation.

A further specific object of this invention is to provide a new and useful tilting support for a vehicular load carrying body, which provides for maximum tilting leverage and thus enables dumping with a jack of minimum capacity and stroke.

Still another specific object of our invention is to provide an improved body dumping assemblage of minimum height which may be applied to a vehicle together with the body, as a unit, and wherein maximum ground clearance is obtained.

An additional specific object of the invention is to provide a compact dumping rig especially applicable to long truck bodies, and which may be manufactured at minimum cost and safely operated with minimum effort.

These and other objects and advantages will be apparent from the following detailed description.

A clear conception of an embodiment of our invention, and of the mode of constructing and of utilizing dumping mechanisms built in accordance with the improvement, may be had by referring to the drawings accompanying and forming a part of this specification wherein like reference characters designate the same or similar parts in the various views.

Fig. 3 is another similar view of the assemblage showing the body fully tilted;

Fig. 4 is an enlarged central longitudinal section through the tilting support for the body;

Fig. 5 is a fragmentary transverse section through the assemblage of Fig. 4 taken along the irregular line 5—5; and Fig. 6 is another fragmentary transverse section through the assemblage of Fig. 4 taken along the line 6—6.

Figure 1:
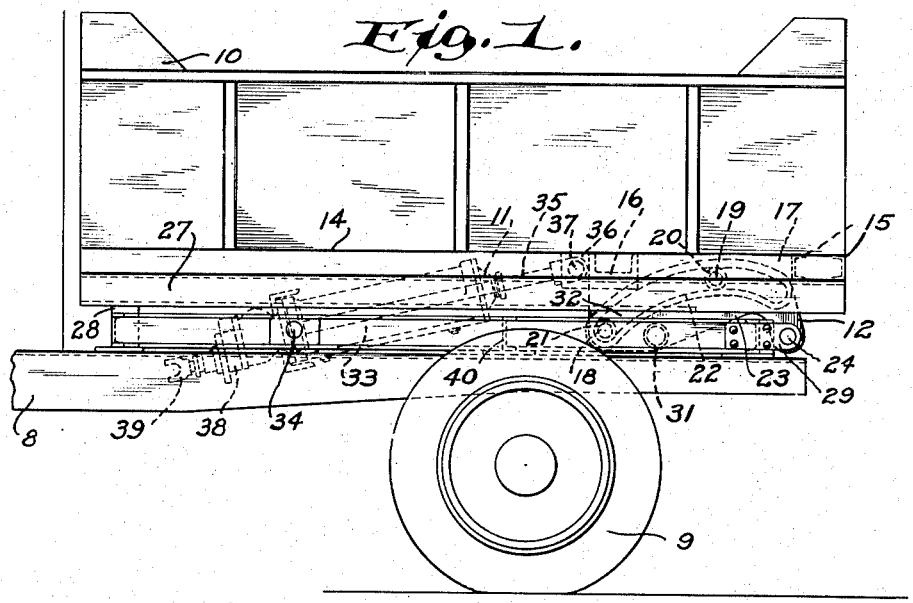
Fig. 1 is a side view of one of our improved vehicular dump body assemblages with the body adapted for horizonal end dumping but disposed in normal load carrying position.

While we have shown our invention as being embodied in a dumping mechanism operable by a hydraulic hoist and especially applicable to rearwardly tiltable dump bodies for motor propelled road vehicles, it is not the intent to thereby unnecessarily restrict the scope, since the novel features are more generally applicable to other types of bodies and vehicles operable with other kinds of lifting and lowering devices.

Referring to the drawings, the chassis 8 of the transporting vehicle is mounted upon wheels 9 in the ordinary manner, and the load carrying body 10 together with its tilting hoist 11 and swing support 12 may be mounted as a unit upon the chassis 8 and secured thereto in any suitable manner. The body 10 may also be of any desired type, that is, either a plain platform or provided with walls and an end gate of well known construction adapted to automatically open when the body is tilted.

The bottom 14 of the body 10 is reenforced at its extreme rear end by transverse beams 15 and at its medial portion by a heavy transverse beam 16; and is provided between the beams 15, 16 with parallel laterally spaced side plates 17 which are rigidly attached to the bottom 14 and to the beams 15, 16. Parallel transverse rods 18, 19 pierce the side plates 17 and are rigidly attached thereto, and the ends of these rods outwardly beyond the plates 17 are provided with rollers 20, 21, see Figs. 5 and 6. The rollers 20, 21 coact with arcuate slots 22 formed in the side walls 23 of the swing support 12, and this support is tiltably mounted upon a rear pivot shaft 24 and has outwardly extending opposite side brackets 25 which are adapted to engage parallel frame beams 26 resting upon and secured to the side beams of the chassis 8 so as to limit the downward movement of the support 12 as clearly shown in Figs. 4 and 6. The body bottom 14 is also provided with longitudinally extending reenforcing channel beams 27 secured thereto over the frame side beams 26 and also rigidly interconnecting the transverse beams 15, 16, and these beams are adapted to engage a transverse stop plate 28 at the front end of the beams 26 as illustrated in Fig. 1, in order to support the body 10 in normal load carrying position. The pivot shaft 24 of the support 12 coacts with end brackets 29 secured to the frame beams 26 remote from the stop plate 28, and is embraced by a tubular member 30 which also rigidly interconnects the side walls 23 of the support. These support walls 23 may be additionally rigidly interconnected by a transverse tubular brace 31 as shown in Fig. 4, and the slots 22 may be closed at their outer sides by means of plates 32 so as to protect and to confine the rollers 20, 21 therein. The swingable support 12 and the body 10 may be formed primarily of metal plates welded together, and while the support 12 is swingable about the pivot shaft 24, the body 10 may be oscillated relative to the support 12 along the arcuate slots 22 in addition to swinging about the shaft 24 with the support 12, see Figs. 1, 2 and 3.

The tilting hoist 11 for moving the body 10 and the support 12, may be of any suitable type, but as shown this hoist is of the single acting single piston hydraulic type comprising a cylinder 33 supported by trunnions 34 journalled in the frame beams 26, and a piston and rod 35 reciprocable within the cylinder 33. The outer end of the rod 35 is pivotally associated with ears 36 attached to the body beam 16, by means of a pin 37, and liquid such as oil is admissible under pressure to the displacement chambers on opposite sides of the hoist piston by means of a pump 38 and valves carried directly by the lower head of the cylinder 33. The pump 38 is operable from the propelling motor of the vehicle by means of a shaft 39 having universal and sliding joints therein, of well known construction, and the hoist control valves are also operable from the vehicle driver's cab in a well known manner. The frame beams 26 which rest directly upon and are secured to the side beams of the chassis 8, may be firmly interconnected by means of transverse beams 40 located so as to avoid interferring with the hoist 11 and swing support 12, and since these elements are supported directly by the frame, the entire body 10 and its dumping assembly may be applied to the vehicle chassis 8 as a unit.

During normal operation of the improved assemblage, the body 10 is ordinarily resting in approximately horizontal position upon the chassis 8 as illustrated in Fig. 1, and is adapted to be transported by the vehicle. The hydraulic jack 11 is then in lowered position beneath the body bottom 14 and between the side beams 26, 27, and the piston rod 35 is in extreme retracted position while the rollers 21 coact with the forward ends of the slots 22 in the support 12. When the body 10 is thus positioned, the front ends of the beams 27 rest upon the stop plate 28, and the support 12 which is swingable about the rear pivot shaft 24, coacts with the frame beams 26 through the brackets 25, thus providing a stable mounting for the load carrying body.

Figure 2:
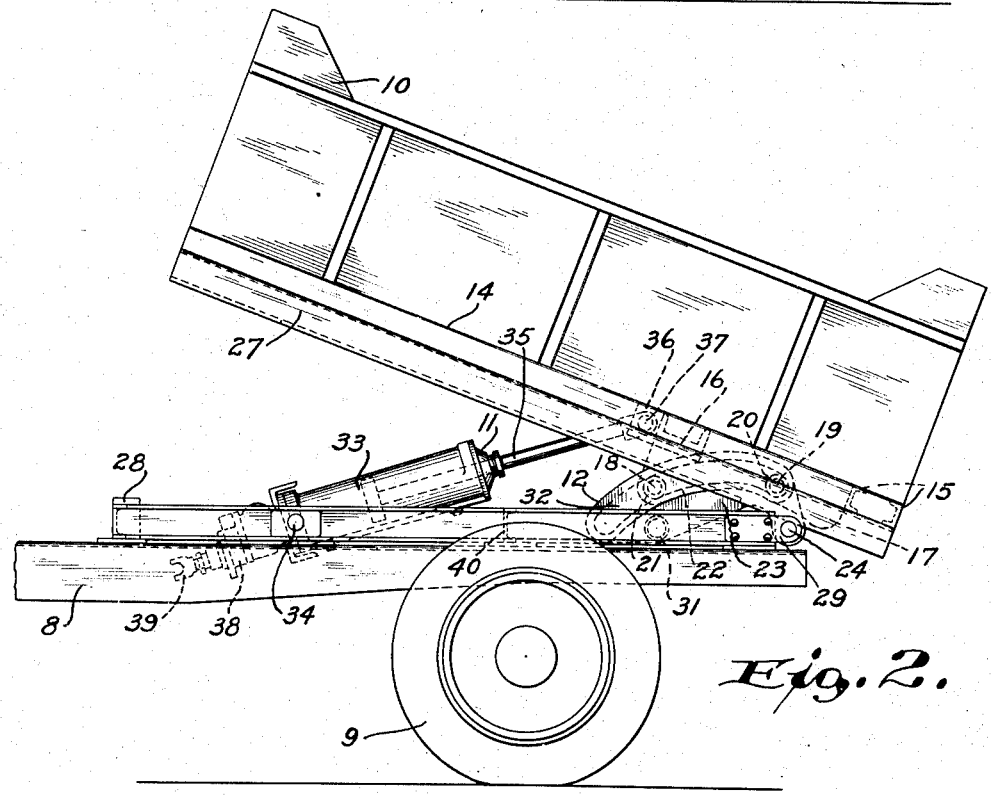
Fig. 2 is a similar view of the same assemblage showing the body partially or initially tilted.

When it becomes desirable to tilt the body 10 so as to dump the load therefrom, the jack or hoist 11 may be supplied with fluid under pressure from the pump 38 acting beneath the piston. The piston rod 35 will then move outwardly, and during the initial rod movement, the swing support 12 will not be displaced or moved but the rollers 20, 21 will ride along the slots 22 thereby causing the loaded body to swing about the axis of generation of the arcuate slots 22 until the rear rollers 20 engage the rear ends of the slots 22 as shown in Fig. 2. This initial dumping movement may obviously be accomplished with relatively low fluid pressure acting upon the hoist piston, because the static loads are low and the leverage relative to the pivot 24 gradually increases while the rollers 20, 21 are moving along the slots 22.

During this initial displacement of the body 10 and its load, the leverage increases considerably, and when the rollers 20 finally engage the rear ends of the slots 22, the swing support 12 is gradually swung upwardly about the axis of the pivot shaft 24 by the continued outward movement of the piston rod 35, thereby also causing the loaded body to swing about this shaft axis. The transfer of swinging motion of the body 10 from the long to the short radius is thus accomplished without shock and after the center of gravity of the load has been considerably elevated, and as the hoist continues to expand, the loaded body 10 is eventually tilted to the steeply inclined position shown in Fig. 3 whereupon the load will be dumped from the rear end of the body, by gravity. When the body 10 has been emptied, the fluid pressure within the hoist 11 may be released, and the body will descend by gravity to cause the swing support 12 to first assume the position of Fig. 2 and to thereafter cause the body to assume normal carrying position as in Fig. 1. Both the dumping and return operations may be quickly accomplished with substantially uniform pressure, without undesirable variations in speed and resultant shock.

From the foregoing detailed description it will be apparent that our invention provides an improved dumping mechanism which besides being extremely simple and compact in construction, is also highly efficient in operation and may be conveniently manipulated. Actual use of our invention has demonstrated that extremely long and heavy bodies may be readily dumped without necessity of introducing excessive initial pressures during the dumping operation. This is due to the provision of a relatively slight rise and long travel during the initial displacement of the body, and the provision of a short radius of swing and more rapid swinging during final dumping will obviously permit location of the pivot 24 a considerable distance above the ground line so as to provide for maximum clearance at the end of the vehicle. The short radius also provides for maximum clearance between the extreme end of the body 10 and the ground line during final dumping of the load, and the entire hoist 11 may be effectively confined within relatively small space, thereby permitting disposition of the body 10 close to the chassis 8 and maintaining the center of gravity at a desirably low point. It has been found that the provision of the arcuate slots 22 also insures dumping at a desirably uniform speed, and these slots need not be true arcs so long as they provide a wedge surface along which the rollers 20, 21 may be readily advanced with minimum effort. The slots 22 may in fact be straight or reversely curved, and may have a portion thereof curved and another portion straight. By mounting the hoist 11 and the swing support 12 upon a unitary frame structure which may be attached to any chassis 8, the entire assemblage may be assembled and shipped as a unit for application thereof to the purchaser's truck. The mechanisms of the assemblage are moreover well protected against possible damage, and the support for the body 10 is of extremely rigid and durable construction. The hydraulic hoist 11 may be either single or double acting and may obviously be replaced by any other type of elevating mechanism, but the invention is especially useful in connection with hydraulic hoists because it provides for elimination of excessively high starting pressures and for reduction of the pressures and of the stroke to a minimum. The improved assemblage may obviously be manufactured and sold at moderate cost and has, as above indicated, proven highly successful in actual commercial use. While the rollers 20, 21 have been shown as being carried by the body 10, and the slots 22 have been formed in the swing support 12, the position of these elements may obviously be reversed, and the slots 22 may also be of any other desired formation adapted to produce the improved results. The combined or dual action of roller and pivot dumping is important, and this action may be utilized to advantage with either single or twin cylinder hoists, or with hoists having the cylinders mounted within or outwardly beyond the sides of the chassis.

It should be understood that it is not desired to limit this invention to the exact details of construction or to the precise mode of use, herein shown and described, for various modifications within the scope of the claims may occur to persons skilled in the art.

We claim:

1. In combination, a frame, a support swingable relative to said frame and having a curved guide generated with a relatively long radius as compared to the radius of swing of said support relative to said frame, a body having an element engageable with and movable along said guide, and means for moving said body to cause said element to ride along said guide to initially tilt said body about said long radius and to subsequently cause said support to swing about said shorter radius to finally tilt the body.

2. In combination, a frame, a support swingable relative to said frame and having an arcuate guide slot generated with a relatively long radius as compared to the radius of swing of said support relative to said frame, a body having a roller engageable with and movable along said slot, and means for moving said body to cause said roller to ride along said slot to initially tilt said body about said long radius and to subsequently cause said support to swing with the body about said shorter radius to finally tilt the body.

3. In combination, a frame, a support pivotally suspended from said frame and having an elongated curved guide extending toward the pivotal axis, a body having an element engageable with and movable along said guide toward said axis, and means for moving said body to cause said element to initially ride along said guide toward said axis during initial tilting of the body and to subsequently cause said support and said body to swing in unison about said axis during final tilting of the body.

4. In combination, a frame, a support pivotally suspended from said frame and having an elongated arcuate guide slot extending toward the pivotal axis, a body having a roller engageable with and movable along said slot toward said axis, and means for moving said body to cause said roller to initially ride along said slot and initially tilt said body without swinging said support and to subsequently cause said support and said body to swing in unison about said axis during final tilting of the body.

5. In combination, a frame, a support pivotally suspended from said frame and having an elongated arcuate guide slot extending toward the pivotal axis, a body having spaced rollers engageable with and movable along said slot toward said axis, and an expandable jack having relatively movable elements pivotally attached to said frame and body respectively, expansion of said jack causing said rollers to initially ride along said slot and thereby initially tilting said body without swinging said support and subsequently causing both said support and said body to swing in unison about said axis during final tilting of the body.

HERMAN C. FRENTZEL, Jr.
CARL G. NOVOTNY.